US011775196B2

(12) United States Patent
Nandan et al.

(10) Patent No.: US 11,775,196 B2
(45) Date of Patent: Oct. 3, 2023

(54) GENERATING DATA REPLICATION CONFIGURATIONS USING ARTIFICIAL INTELLIGENCE TECHNIQUES

(71) Applicant: EMC IP Holding Company LLC, Hopkinton, MA (US)

(72) Inventors: Kasnadi Sitaram Nandan, Bangalore (IN); Mohit Kolluri, Hyderabad (IN); Vinod Kumar, Bangalore (IN); Sujay Prasheel Sundaram, Austin, TX (US); Sarat Manchiraju, Pflugerville, TX (US); Bijan Kumar Mohanty, Austin, TX (US); Hung T. Dinh, Austin, TX (US); Subrato Nath, Bangalore (IN); Naveen Silvester, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 228 days.

(21) Appl. No.: 16/884,622

(22) Filed: May 27, 2020

(65) Prior Publication Data

US 2021/0373770 A1    Dec. 2, 2021

(51) Int. Cl.
*G06F 3/06* (2006.01)
*G06N 5/04* (2023.01)
*G06N 20/00* (2019.01)

(52) U.S. Cl.
CPC ............ *G06F 3/065* (2013.01); *G06F 3/0604* (2013.01); *G06F 3/0673* (2013.01); *G06N 5/04* (2013.01); *G06N 20/00* (2019.01)

(58) Field of Classification Search
CPC ........ G06F 3/065; G06F 3/0604; G06N 20/00
See application file for complete search history.

(56) References Cited

U.S. PATENT DOCUMENTS

| 10,565,226 | B2 | 2/2020 | Goldmann et al. |
| 10,650,024 | B2 | 5/2020 | Sridhara |
| 2014/0164328 | A1* | 6/2014 | Calo ................. G06F 16/27 |
| | | | 707/626 |
| 2017/0161758 | A1* | 6/2017 | Towriss ............ G06Q 30/0201 |
| 2018/0032870 | A1* | 2/2018 | Liu .................. G06Q 40/025 |
| 2018/0287856 | A1* | 10/2018 | Whitner ............... H04L 67/10 |
| 2019/0200076 | A1* | 6/2019 | Sanchesshayda .... H04N 21/252 |
| 2020/0034053 | A1 | 1/2020 | Sharma et al. |
| 2020/0081804 | A1 | 3/2020 | Sridhara |
| 2020/0242466 | A1* | 7/2020 | Mohassel ................ H04L 9/008 |
| 2021/0216572 | A1* | 7/2021 | Braghin ............... G06F 16/215 |

OTHER PUBLICATIONS

Oracle, Understanding Oracle GoldenGate, Sep. 2018.

* cited by examiner

*Primary Examiner* — Baboucarr Faal
(74) *Attorney, Agent, or Firm* — Ryan, Mason & Lewis, LLP

(57) ABSTRACT

Methods, apparatus, and processor-readable storage media for generating data replication configurations using AI techniques are provided herein. An example computer-implemented method includes obtaining input data pertaining to at least one data replication operation; determining a set of configuration parameters for the at least one data replication operation by applying one or more AI techniques to at least a portion of the input data; and performing one or more automated actions based at least in part on the determined set of configuration parameters for the at least one data replication operation.

20 Claims, 6 Drawing Sheets

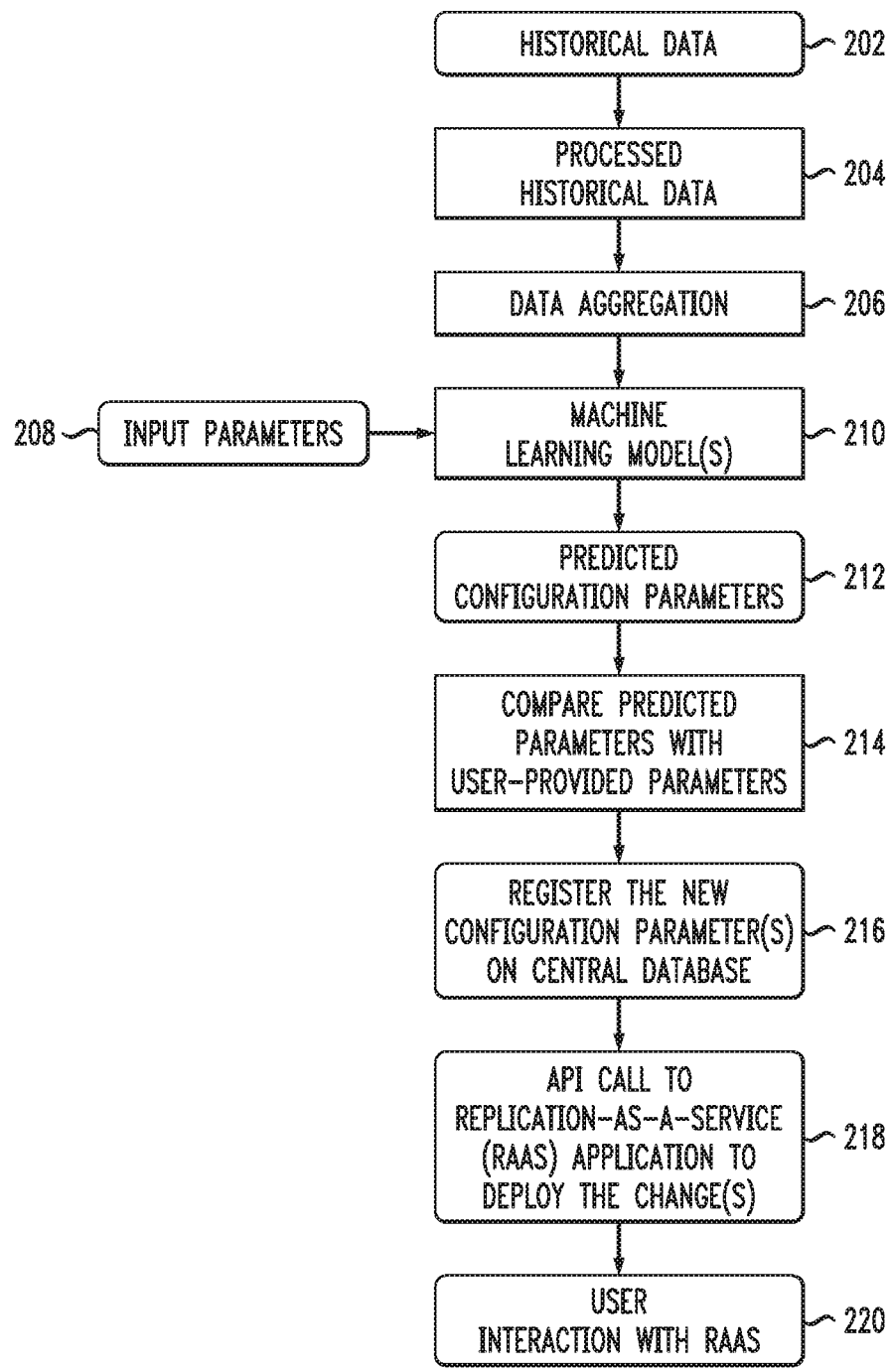

FIG. 3

```
In [ ]: import pandas as pd
        import numpy as np
        import matplotlib.pyplot as plt
        %matplotlib inline
        warnings.filterwarnings("ignore")
        plt.style.use('fivethirtyeight')

data = pd.read_csv('ConfigParameters.csv')
        print data.head()
        print '\n Data Types:'
        print data.dtypes dateparse = lambda dates: [pd.datetime.strptime(dates, '%Y-%m')
        data = pd.read_csv('ConfigParameters.csv', parse_dates=['Month'], index_col='Month', date_parser=dateparse)
        print ('\n Parsed Data:')
        print (data.head())

from datetime import datetime
        con=data['Month']
        data['Month']=pd.to_datetime(data['Month'])
        data.set_index('Month', inplace=True)
        #check datatype of index
        data.index
```

```
# Test stationary property
from statsmodels.tsa.stattools import adfuller
def test_stationarity(timeseries) :

#Determing rolling statistics
    rolmean = pd.rolling_mean(timeseries, window=12)
    rolstd = pd.rolling_std(timeseries, window=12)

# Using ARIMA for prediction
from statsmodels.tsa.arima_model import ARIMA
from sklearn.metrics import mean_squared_error
from math import sqrt fit model
model = ARIMA(train, order=(1, 1, 1))
model_fit = model.fit(disp=1)
start_index = valid.index.min()
end_index = valid.index.max()

#Predictions using ARIMA
prediction = model_fit.predict(start=start_index, end=end_index)
mse = mean_squared_error(y[start_index:end_index], predictions)
rmse = sqrt(mse)
print('RMSE: { }, MSE:{ }'.format(rmse,mse))
plt.plot(y.passengers)
plt.plot(predictions, color='red')
plt.title('RMSE: %.4f'% rmse)
```

FIG. 4    400

```
def sigmoid(z) :
    # Activation function used to map any real value between 0 and 1
    return 1 / (1 + np.exp(-z))

def net_input (theta, x) :
    # Computes the weighted sum of inputs
    return np.dot(x, theta)

def probability(theta, x) :
    # Returns the probability after passing through sigmoid
    return sigmoid(net_input (theta, x))

def cost_function(theta, x, y) :
    # Computes the cost function for all the training samples
    m = x.shape[0]
    total_cost = -(1 / m) * np.sum(
        y * np.log(probability(theta, x)) + (1 - y) * np.log(
            1 - probability(theta, x)))
    return total_cost def gradient(theta, x, y) :
    # Computes the gradient of the cost function at the point theta
    m = x.shape[0]
    return (1 / m) * np.dot(x.T, sigmoid(net_input(theta, x)) - y)

def fit (x, y, theta) :
    opt_weights = opt.fmin_tnc(func=cost_function, x0=theta,
                fprime=gradient, args=(x, y.flatten()))
    return opt_weights[0]

def predict(x) :
    theta = parameters[:, np.newaxis]
    return probability(theta, x)

preparing the data for building the model

X = np.c_[np.ones((X.shape[0], 1)), X]
    y = y[:, np.newaxis]
    theta = np.zeros((X.shape[1], 1))

#Logistic Regression using Gradient Descent
    #print(cost_function(theta, X, y))
    parameters = fit(X, y, theta)
    model_accuracy = accuracy(X, y.flatten())
    print("The accuracy of the model is ( ) ".format(model_accuracy))
    print("The model parameters using Gradient descent")
    print("\n")
    print(parameters)
```

GENERATING DATA REPLICATION CONFIGURATIONS USING ARTIFICIAL INTELLIGENCE TECHNIQUES

FIELD

The field relates generally to information processing systems, and more particularly to data replication in such systems.

BACKGROUND

Enterprises and/or other organizational users often implement proprietary data replication technologies that can include diverse mappings which require customized configurations. Typically, expert knowledge and manual efforts are needed to analyze and design appropriate architectures and/or configuration solutions. For example, conventional data replication approaches can include tasking individuals with understanding the requirements for a given data replication implementation, and manually creating a data replication solution based on that human understanding. Such approaches, however, are error-prone as well as time and labor-intensive.

SUMMARY

Illustrative embodiments of the disclosure provide techniques for generating data replication configurations using artificial intelligence (AI) techniques. An exemplary computer-implemented method includes obtaining input data pertaining to at least one data replication operation, determining a set of configuration parameters for the at least one data replication operation by applying one or more AI techniques to at least a portion of the input data, and performing one or more automated actions based at least in part on the determined set of configuration parameters for the at least one data replication operation.

Illustrative embodiments can provide significant advantages relative to conventional data replication approaches. For example, problems associated with error-prone as well as time and labor-intensive solutions are overcome in one or more embodiments through automatically determining effective configuration parameters by applying AI techniques to input data related to given data replication operations.

These and other illustrative embodiments described herein include, without limitation, methods, apparatus, systems, and computer program products comprising processor-readable storage media.

BRIEF DESCRIPTION OF THE DRAWINGS

FIG. 2 shows an example workflow for optimizing configuration parameters using AI-based predictive analytics in an illustrative embodiment.

FIG. 3 shows an example code snippet for configuration parameter prediction using a time series stationary stochastic process with an autoregression and moving average (ARMA) in an illustrative embodiment.

FIG. 4 shows an example code snippet for configuration parameter prediction using a sigmoid function in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
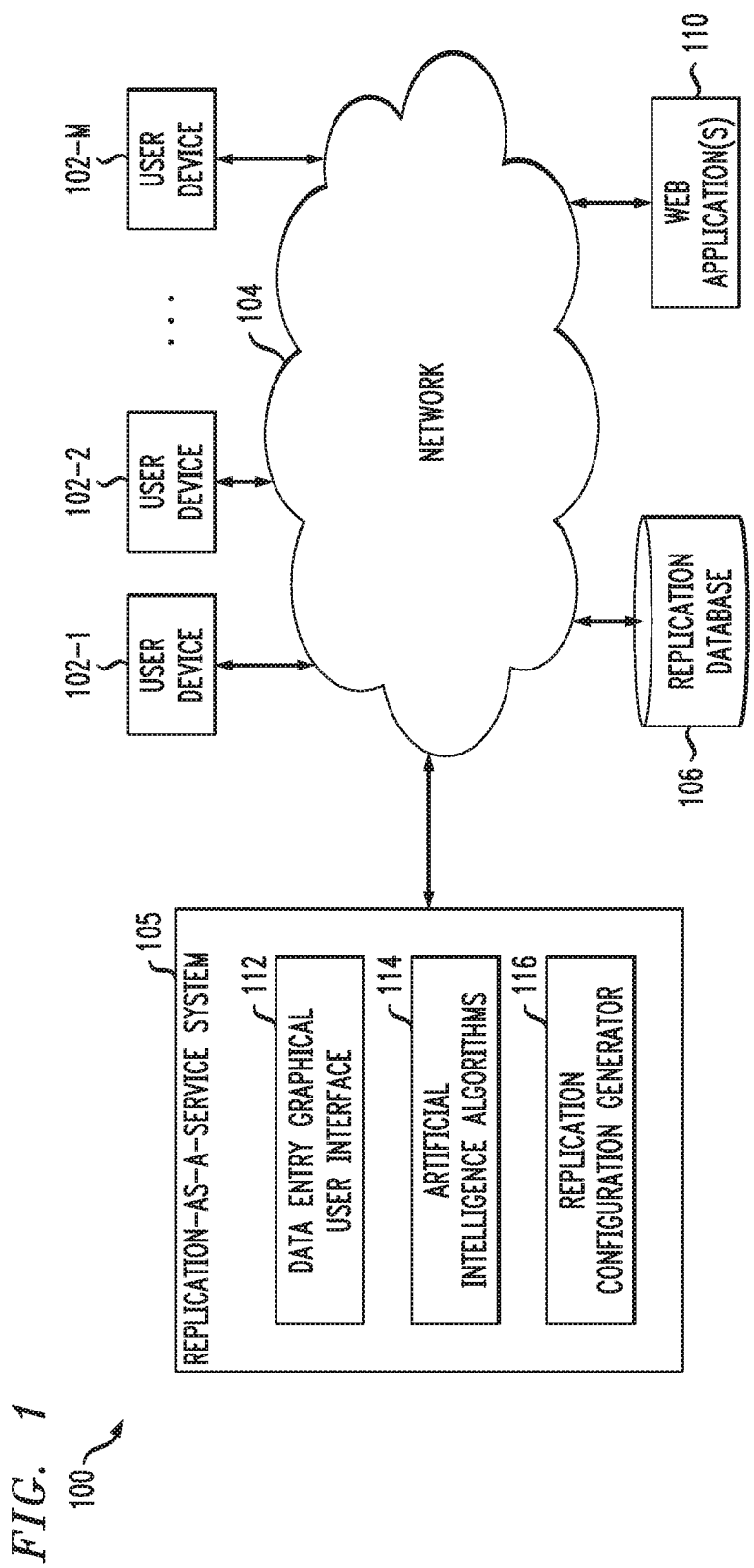
FIG. 1 shows an information processing system configured for generating data replication configurations using AI techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks," but the latter is assumed to be a component of the former in the context of the FIG. 1 embodiment. Also coupled to network 104 is replication-as-a-service (RaaS) system 105 and one or more web applications 110 (e.g., applications related to data replication operations and/or configuration assessments pertaining thereto).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the RaaS system 105 can have an associated database 106 configured to store data pertaining to replication operations and configurations, which comprise, for example, values pertaining to parameters such as transaction volume, table counts for replication operations, load requirements, etc.

The database 106 in the present embodiment is implemented using one or more storage systems associated with the RaaS system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the RaaS system 105 can be one or more input-output devices, which illustratively comprise keyboards, displays or other types of input-output devices in any combination. Such input-output devices can be used, for example, to support one or more user interfaces to the RaaS system 105, as well as to support communication between the RaaS system 105 and other related systems and devices not explicitly shown.

Additionally, the RaaS system 105 in the FIG. 1 embodiment is assumed to be implemented using at least one processing device. Each such processing device generally comprises at least one processor and an associated memory, and implements one or more functional modules for controlling certain features of the RaaS system 105.

More particularly, the RaaS system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the RaaS system 105 to communicate over the network 104 with the user devices 102, and illustratively comprises one or more conventional transceivers.

The RaaS system 105 further comprises a data entry graphical user interface (GUI) 112, artificial intelligence algorithms 114, and a replication configuration generator 116.

It is to be appreciated that this particular arrangement of modules 112, 114 and 116 illustrated in the RaaS system 105 of the FIG. 1 embodiment is presented by way of example only, and alternative arrangements can be used in other embodiments. For example, the functionality associated with the modules 112, 114 and 116 in other embodiments can be combined into a single module, or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for AI-based data replication using time series stationary stochastic processes involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example RaaS system 105 in computer network 100 will be described in more detail with reference to the flow diagram of FIG. 5.

Accordingly, at least one embodiment includes implementing an AI-based RaaS using a time series stationary stochastic process with a combined ARMA and sigmoid function. Such an embodiment is technology-agnostic, with an ability to replicate data from any source to any target. As illustrated in FIG. 1, one or more embodiments include generating and/or implementing a GUI for the entering of data (e.g., from one or more users), wherein such a GUI can be utilized as a self-service. Accordingly, in at least one embodiment, one or more users (via one or more user devices) input requirements pertaining to a data replication operation. Such requirements might include, for example, the transactional volume per table per some given temporal increment (e.g., daily) at the source, the number of tables to be under replication, the initial load required, etc. The parameter values are then read from a database (e.g., database 106 in the FIG. 1 embodiment), and one or more AI algorithms are implemented to process the parameters and values thereof to validate whether the parameters provided by the user(s) (via the GUI) are the optimal set of parameters for the replication operation in question based at least in part on analysis of historical data.

Additionally, one or more embodiments include predicting, using at least one machine learning model (e.g., as contained as part of AI algorithms 114 in the FIG. 1 embodiment), an optimal set of configurations for the replication operation in question, and subsequently generating and outputting (to the user(s)) a corresponding replication solution via the GUI. Such an embodiment can also include integrating the machine learning-based prediction(s) into existing scheduled data replication jobs to determine and/or check if the previously-established configurations are sufficient and/or optimal for such jobs, and also to show (via the GUI) any configuration changes that are potentially needed or recommended (e.g., enabling parallelism based on volumes, adding, modifying, and/or deleting parameters that might improve the performance of the replication operation, etc.).

As also detailed herein, one or more embodiments include generating at least one machine learning model to be utilized in determining replication configuration predictions. Such an embodiment includes obtaining and/or gathering historical data pertaining to existing data replication operations. To set-up a replication operation, a configuration file is typically required, wherein the file contains a variety of generic and specific configuration parameters that are needed to keep the replication running without any issues. Gathering the data of such parameters helps the model to determine a new configuration that enables the replication operation to run with no manual intervention from the time that the operation has been set-up and also during exception cases (e.g., data surge instances). Such data can be preprocessed and/or cleansed, using one or more established data processing techniques, to render the data as relevant as possible for the creation of the machine learning prediction model(s) in question. Using the preprocessed data, at least one embodiment includes building a time series stationary stochastic process by combining ARMA and sigmoid functions. A model incorporating such a time series stationary stochastic process can then be trained to ensure improved and/or optimized configurations are predicted for a particular data replication operation and/or integration. As detailed herein, replication deals with transmission of data from at least one source to at least one target, and integration refers to a source-target combination. In one or more embodiments, the model(s) can also be tested and certified, for example, by a subject matter expert, to ensure a level of prediction quality based at least in part on the parameters suggested by user(s). Ultimately, the developed (and trained and/or tested) model(s) can be deployed to predict configurations to be utilized for a given data replication operation.

In one or more embodiments, deploying such a model includes predicting an optimized set of configuration parameters for a given data replication operation and/or integration. By way of example, such an embodiment can include one or more users collecting data relevant to one or more replication tasks and storing such data in a database. An AI-based RaaS application (such as system 105 in the FIG. 1 embodiment, for example) reads at least a portion of the data stored in the database and feeds the read data into at least one machine learning model. The at least one machine learning model then processes the data and predicts a set of configuration parameters (e.g., an optimized set of configuration parameters) for a given data replication operation. The predicted set of configuration parameters is then recorded in the database. Also, such an embodiment includes initiating an application programming interface (API) call for the RaaS application to update the configuration parameters in connection with one or more user devices associated with the given data replication operation. Additionally or alternatively, at least one embodiment can include recomputing, for jobs (e.g., data replication operations) running on regular intervals (e.g., once a day, once a week, etc.), an optimized set of configurations, and generating a report for review by one or more subject matter experts.

FIG. 2 shows an example workflow for optimizing configuration parameters using AI-based predictive analytics in an illustrative embodiment. By way of illustration, FIG. 2 depicts historical replication-related data 202, which are cleaned and/or preprocessed to generate processed data 204. Such data are aggregated in step 206, wherein aggregation is the formulation of data into a specific format for use by the machine learning model(s), and the aggregated data along with one or more input parameters 208 (provided by the user(s)) are input to the machine learning model(s) 210 for training and/or implementation. In implementing the machine learning model(s), values pertaining to the input parameters 208 are obtained (e.g., from a database) and processed to determine a predicted set of configuration parameters 212 for a given data replication operation.

Step 214 includes comparing the predicted set of configuration parameters with the user-provided input parameters 208, and if differences are noted, then step 216 includes registering the new and/or modified configuration parameters on the database. Further, step 218 includes initiating an API call to a RaaS application to deploy the change(s) to the configuration parameters (e.g., in the user data replication environment), and step 220 includes enabling a user interaction with the RaaS (e.g., via a GUI).

As noted above in connection with FIG. 2, as well as further detailed herein, various input parameters are provided to at least one machine learning model as part of carrying out one or more embodiments. Example input parameters can include, for example, CACHEMGR, CACHESIZE (i.e., control of the amount of virtual memory and temporary disk space), WARNLONGTRANS 5 h, CHECKINTERVAL 30 m (i.e., the length of time that a transaction can be open before an extract operation), TRANLOGOPTIONS EXCLUDEUSER (i.e., exclusion of user-related transactions), DBOPTIONS ALLOWUNUSED-COLUMN (i.e., specification of database options; e.g., when an extract operation encounters a table with an unused column, it continues processing and generates a warning), LOGALLSUPCOLS (i.e., automatic inclusion in the trail record of the before image of logged columns for both UPDATE and DELETE operations), UPDATERECORD-FORMAT FULL (i.e., combination of the before and after images of an UPDATE operation into a single record), TRANLOGOPTIONS SOURCE_OS_TIMEZONE (e.g., implementation when a database timestamp and replication configured on a middle tier is different), ENCRYPTTRAIL AES192 (i.e., enablement of encryption of a physical file), FETCHOPTIONS (i.e., control of certain aspects of the way that an extract process fetches data), USELATESTVERSION (e.g., used in conjunction with FETCHOPTIONS), GETREPLICATES (i.e., control of whether or not data manipulation language (DML) transactions issued by a replication operation are captured), PASSTHRU (e.g., captured data can be cascaded to a data pump on an intermediary system that does not host a database), DECRYPTTRAIL (i.e., decryption of the physical file before replicating to a database), DBOPTIONS NOSUPPRESSTRIGGERS (i.e., facilitation of triggers defined in a database to be executed without being suppressed), HANDLECOLLISIONS (i.e., control of whether or not a replication operation attempts to resolve duplicate record and missing record errors when applying similar structured query language (SQL) on the target), BATCHSQL BATCHTRANSOPS (i.e., cause a replication operation to organize similar SQL statements into arrays and apply them at an accelerated rate), REPERROR DEFAULT, EXCEPTION, REPERROR 1403 IGNORE (e.g., when a known error is encountered by a replication operation, mention whether it shall continue to process or write to a trace log file or terminate the operation), IGNOREDELETES (i.e., parameters to control whether or not DELETE operations are processed), INSERTUPDATES (i.e., when an update transaction is encountered, insert it as a new record), INSERTDELETES (i.e., when a delete transaction is encountered, insert it as a new record), SOURCECHARSET UTF-8 (i.e., control of the conversion of data from the source character set to the target character), DBOPTIONS NOCATALOGCONNECT, DBOPTIONS_ODBC_UNIX_UTF16 (i.e., prevention of a new connection for catalog queries), etc.

As detailed herein, one or more embodiments include predicting data replication configuration parameters using time series data with a combined ARMA and sigmoid function. In such an embodiment, time series forecasting techniques are used, in part, because data replication configuration parameters routinely change over time, and the AI-based algorithm(s) described herein predict(s) values that are time-dependent. Additionally, as most configuration parameters are categorical, feature hashing can be carried out before training or implementing the model. In one or more embodiments, feature hashing is a space-efficient way of vectorizing and classifying features (that is, turning arbitrary features into indices in a vector or matrix). Also, feature hashing can include converting text into a numerical order so that the machine learning model(s) can categorically utilize the data.

Further, in at least one embodiment, one or more AI algorithms are utilized to perform statistical analysis of how configuration parameters change over a given period of time, and capture the level (e.g., a baseline value), trend(s), seasonality (e.g., patterns or cycles of behavior), and noise (i.e., variability) of such configuration parameters over time. Once a model (e.g., a machine learning model such as detailed herein) is trained with historical configuration parameter data, predictions for a given data replication operation are made by extrapolating on future observations. Such predictions are generated, in one or more embodiments, by removing noise (e.g., parameter outliers) from the processed data, and processing the remaining data using a time series stationary stochastic process utilizing an ARMA technique for prediction purposes and a sigmoid function for binary classification reconfirmation from the output of the ARMA technique.

FIG. 3 shows an example code snippet for configuration parameter prediction using a time series stationary stochastic process with ARMA in an illustrative embodiment. In this embodiment, example code snippet 300 is executed by or under the control of at least one processing system and/or device. For example, the example code snippet 300 may be viewed as comprising a portion of a software implementation of at least part of RaaS system 105 of the FIG. 1 embodiment.

The example code snippet 300 illustrates the use of Python and SciKitLearn libraries to implement time series-based forecasting and logistics regression classification with a sigmoid function to predict configuration parameters. Specifically, as depicted in code snippet 300, libraries (e.g., Pandas, NumPy, and matplotlib) are imported, and a configuration parameter data file is loaded and read (i.e., data=pd.read_csv('ConfigParameters.CSV', parse_dates=['Month'], index_col=['Month'], date_parser='dateparse'). Also, an ARMA model (e.g., an autoregressive integrated moving average (ARIMA) forecasting algorithm) is used for time series forecasting (i.e., model=ARIMA(train, order=(1, 1, 1))), and the model is fitted for an algorithm (i.e., model_fit=model.fit(disp=1)) and used to generate one or more predictions (i.e., predictions=model_fit.predict (start=start_index, end=end_index)). As also depicted in code snippet 300, the functional accuracy of the model is calculated using mean squared error (MSE) and root mean squared error (RMSE) for the generated prediction(s) (i.e., mse=mean_squared_error(y[start index:end_index], predictions) and (rmse=sqrt(mse)).

It is to be appreciated that this particular example code snippet shows just one example implementation of configuration parameter prediction using a time series stationary stochastic process with ARMA, and alternative implementations of the process can be used in other embodiments.

FIG. 4 shows an example code snippet for configuration parameter prediction using a sigmoid function in an illustrative embodiment. In this embodiment, example code snippet 400 is executed by or under the control of at least one processing system and/or device. For example, the example code snippet 400 may be viewed as comprising a portion of a software implementation of at least part of RaaS system 105 of the FIG. 1 embodiment.

The example code snippet 400 illustrates using Python, SciKitLearn, Pandas and NumPy libraries to build a logistics regression with a sigmoid activation function. Specifically, in code snippet 400, custom functions such as the sigmoid activation function, a gradient function, and a cost function are implemented in Python, and a logistic regression model with a sigmoid function is created and implemented. Further, as also depicted in code snippet 400, the accuracy of the function is calculated.

It is to be appreciated that this particular example code snippet shows just one example implementation of configuration parameter prediction using a sigmoid function, and alternative implementations of the process can be used in other embodiments.

As detailed herein, one or more embodiments are technology-agnostic, capable of predicting configuration parameters for data replication operations from any source to any target. Such an embodiment includes comparing statistical data in a central database or repository with user-provided input, and generating a template with recommended configuration settings using a machine learning model and a combination of AI-based algorithms (e.g., a time series stationary stochastic process that includes ARMA techniques and a sigmoid function) to proactively build a replication operation for a given integration on demand. By storing configuration files along with statistical data, at least one embodiment includes facilitating configuration parameter determinations by taking into consideration variables such as, for example, the level of parallelism required (e.g., multiple sources to multiple targets), specific parameters to fulfill application needs, etc.

At least one embodiment can include predicting configuration parameters for a new and/or yet-to-commence replication operation and/or predicting configuration parameters for an ongoing and/or in-progress replication operation, wherein such predicted configuration parameters can be implemented as an update to the ongoing and/or in-progress replication operation. Additionally or alternatively, in one or more embodiments, the AI techniques utilized therein can include detecting anomalies in a given set of configuration parameters and carrying out one or more remedial and/or self-healing actions in response to the detected anomalies.

Figure 5:
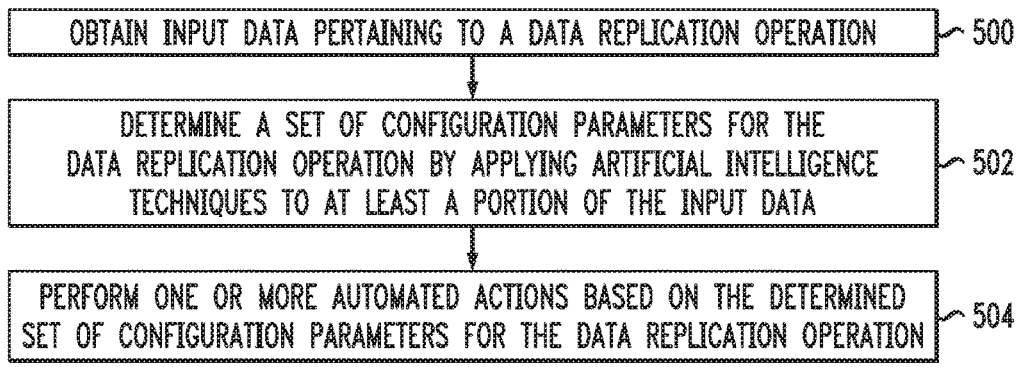
FIG. 5 is a flow diagram of a process for generating data replication configurations using AI techniques in an illustrative embodiment.

FIG. 5 is a flow diagram of a process for generating data replication configurations using AI techniques in an illustrative embodiment. It is to be understood that this particular process is only an example, and additional or alternative processes can be carried out in other embodiments.

In this embodiment, the process includes steps 500 through 504. These steps are assumed to be performed by the RaaS system 105 utilizing its modules 112, 114 and 116.

Step 500 includes obtaining input data pertaining to at least one data replication operation.

Step 502 includes determining a set of configuration parameters for the at least one data replication operation by applying one or more artificial intelligence techniques to at least a portion of the input data. In at least one embodiment, the one or more artificial intelligence techniques include a time series stationary stochastic model comprising at least one autoregression and moving average technique and at least one sigmoid function. In such an embodiment, applying the one or more artificial intelligence techniques includes predicting, for each of multiple candidate configuration parameters, a probability of success if deployed in the at least one data replication operation by processing the configuration parameter and the at least a portion of the input data using the at least one autoregression and moving average technique. Such an embodiment also includes performing, for each of the multiple candidate configuration parameters, a binary classification by processing the predictions generated by the at least one autoregression and moving average technique using the at least one sigmoid function.

One or more embodiments additionally include building the time series stationary stochastic model by processing historical data pertaining to multiple data replication operations, wherein processing the historical data pertaining to multiple data replication operations includes performing statistical analysis of how multiple configuration parameters change over one or more periods of time. Performing the statistical analysis can include, for example, determining a baseline value for each of the multiple configuration parameters, determining one or more trends associated with each of the multiple configuration parameters, determining one or more seasonality patterns associated with each of the multiple configuration parameters, and/or determining variability associated with each of the multiple configuration parameters.

Step 504 includes performing one or more automated actions based at least in part on the determined set of configuration parameters for the at least one data replication operation. In one or more embodiments, performing the one or more automated actions can include, for example, arranging the at least one data replication operation in accordance with the determined set of configuration parameters, updating the at least one data replication operation in accordance with the determined set of configuration parameters, and/or displaying, via at least one graphical user interface, one or more configuration parameter changes recommended for the at least one data replication operation.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional data replication approaches. For example, some embodiments are configured to automatically determine optimal configuration parameters by applying AI techniques to input data related to given data replication operations. These and other embodiments can effectively overcome problems associated with error-prone as well as time and labor-intensive solutions.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
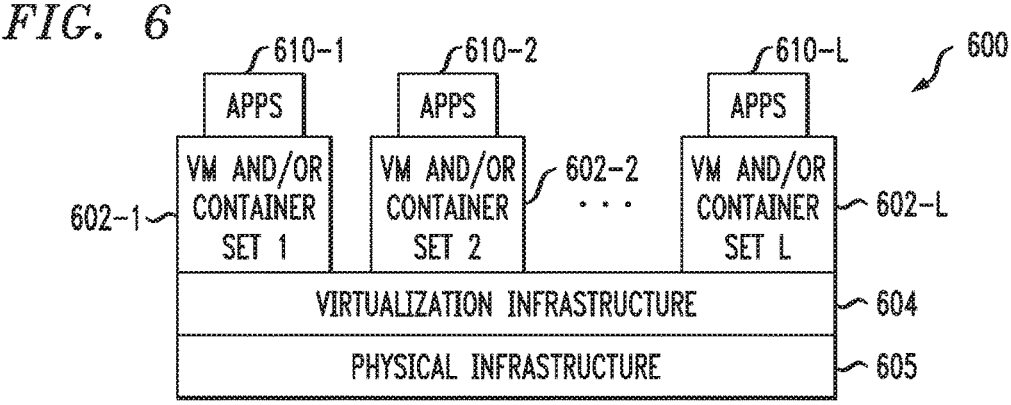
FIGS. 6 and 7 show examples of processing platforms that may be utilized to implement at least a portion of an information processing system in illustrative embodiments.
Figure 7:
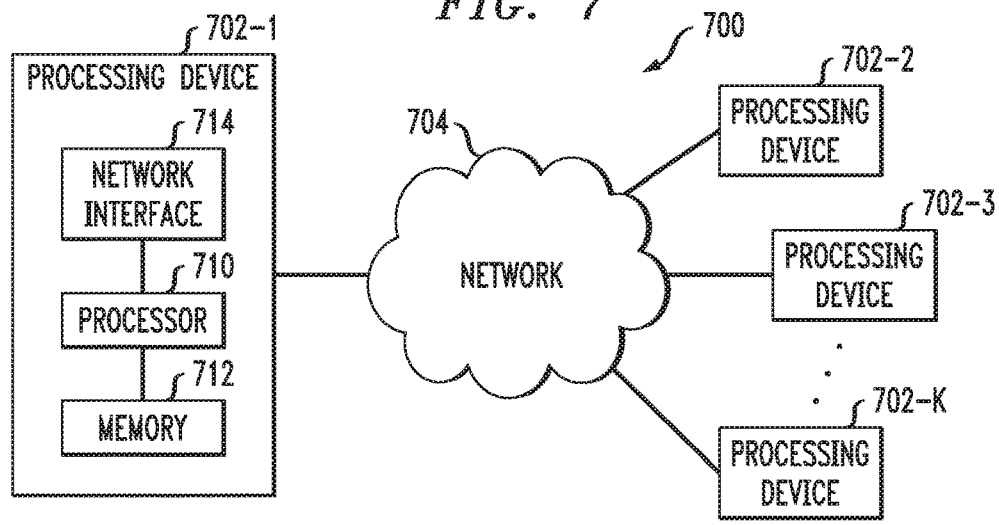

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . , 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more distributed processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a microcontroller, an application-specific integrated circuit (ASIC), a field-programmable gate array (FPGA) or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining input data pertaining to at least one data replication operation, wherein the input data comprises information pertaining to requirements for the at least one data replication operation, the information pertaining to requirements for the at least one data replication operation comprising (i) transactional volume per structured dataset per at least one given temporal increment for at least one source, and (ii) a number of structured datasets subject to replication;
determining a set of configuration parameters for the at least one data replication operation by applying one or more artificial intelligence techniques to at least a portion of the input data, wherein applying the one or more artificial intelligence techniques to at least a portion of the input data comprises processing at least a portion of the information pertaining to requirements for the at least one data replication operation using a time series stationary stochastic model comprising at least one autoregression and moving average technique and at least one activation function; and
performing one or more automated actions based at least in part on the determined set of configuration parameters for the at least one data replication operation, wherein performing the one or more automated actions comprises:
performing a comparison of the determined set of configuration parameters for the at least one data replication operation to user-provided configuration parameters for the at least one data replication operation;
displaying, via at least one graphical user interface and based at least in part on the comparison, one or more configuration parameter changes, to the user-provided configuration parameters, recommended for the at least one data replication operation; and
updating, in at least one user data replication environment and by initiating one or more application programming interface calls, the at least one data replication operation in accordance with one or more of (i) at least one configuration parameter of the determined set of configuration parameters and (ii) at least one of the one or more configuration parameter changes;
wherein the method is performed by at least one processing device comprising a processor coupled to a memory.

2. The computer-implemented method of claim 1, wherein applying the one or more artificial intelligence techniques comprises:
predicting, for each of multiple candidate configuration parameters, a probability of success if deployed in the at least one data replication operation by processing the configuration parameter and the at least a portion of the input data using the at least one autoregression and moving average technique; and
performing, for each of the multiple candidate configuration parameters, a binary classification by processing the predictions generated by the at least one autoregression and moving average technique using the at least one activation function.

3. The computer-implemented method of claim 1, further comprising:
building the time series stationary stochastic model by processing historical data pertaining to multiple data replication operations.

4. The computer-implemented method of claim 3, wherein processing the historical data pertaining to multiple data replication operations comprises performing statistical analysis of how multiple configuration parameters change over one or more periods of time.

5. The computer-implemented method of claim 4, wherein performing the statistical analysis comprises determining a baseline value for each of the multiple configuration parameters.

6. The computer-implemented method of claim 4, wherein performing the statistical analysis comprises determining one or more trends associated with each of the multiple configuration parameters.

7. The computer-implemented method of claim 4, wherein performing the statistical analysis comprises determining one or more seasonality patterns associated with each of the multiple configuration parameters.

8. The computer-implemented method of claim 4, wherein performing the statistical analysis comprises determining variability associated with each of the multiple configuration parameters.

9. The computer-implemented method of claim 1, wherein performing the one or more automated actions comprises arranging the at least one data replication operation in accordance with the determined set of configuration parameters.

10. A non-transitory processor-readable storage medium having stored therein program code of one or more software programs, wherein the program code when executed by at least one processing device causes the at least one processing device:
to obtain input data pertaining to at least one data replication operation, wherein the input data comprises information pertaining to requirements for the at least one data replication operation, the information pertaining to requirements for the at least one data replication operation comprising (i) transactional volume per structured dataset per at least one given temporal increment for at least one source, and (ii) a number of structured datasets subject to replication;
to determine a set of configuration parameters for the at least one data replication operation by applying one or more artificial intelligence techniques to at least a portion of the input data, wherein applying the one or more artificial intelligence techniques to at least a portion of the input data comprises processing at least a portion of the information pertaining to requirements for the at least one data replication operation using a time series stationary stochastic model comprising at least one autoregression and moving average technique and at least one activation function; and
to perform one or more automated actions based at least in part on the determined set of configuration parameters for the at least one data replication operation, wherein performing the one or more automated actions comprises:
performing a comparison of the determined set of configuration parameters for the at least one data replication operation to user-provided configuration parameters for the at least one data replication operation;

displaying, via at least one graphical user interface and based at least in part on the comparison, one or more configuration parameter changes, to the user-provided configuration parameters, recommended for the at least one data replication operation; and updating, in at least one user data replication environment and by initiating one or more application programming interface calls, the at least one data replication operation in accordance with one or more of (i) at least one configuration parameter of the determined set of configuration parameters and (ii) at least one of the one or more configuration parameter changes.

11. The non-transitory processor-readable storage medium of claim 10, wherein applying the one or more artificial intelligence techniques comprises:
predicting, for each of multiple candidate configuration parameters, a probability of success if deployed in the at least one data replication operation by processing the configuration parameter and the at least a portion of the input data using the at least one autoregression and moving average technique; and
performing, for each of the multiple candidate configuration parameters, a binary classification by processing the predictions generated by the at least one autoregression and moving average technique using the at least one activation function.

12. The non-transitory processor-readable storage medium of claim 10, wherein performing the one or more automated actions comprises arranging the at least one data replication operation in accordance with the determined set of configuration parameters.

13. The non-transitory processor-readable storage medium of claim 10, wherein the program code when executed by the at least one processing device causes the at least one processing device:
to build the time series stationary stochastic model by processing historical data pertaining to multiple data replication operations.

14. The non-transitory processor-readable storage medium of claim 13, wherein processing the historical data pertaining to multiple data replication operations comprises performing statistical analysis of how multiple configuration parameters change over one or more periods of time.

15. The non-transitory processor-readable storage medium of claim 14, wherein performing the statistical analysis comprises determining a baseline value for each of the multiple configuration parameters.

16. The non-transitory processor-readable storage medium of claim 14, wherein performing the statistical analysis comprises determining one or more trends associated with each of the multiple configuration parameters.

17. An apparatus comprising:
at least one processing device comprising a processor coupled to a memory;
the at least one processing device being configured:
to obtain input data pertaining to at least one data replication operation, wherein the input data comprises information pertaining to requirements for the at least one data replication operation, the information pertaining to requirements for the at least one data replication operation comprising (i) transactional volume per structured dataset per at least one given temporal increment for at least one source, and (ii) a number of structured datasets subject to replication;
to determine a set of configuration parameters for the at least one data replication operation by applying one or more artificial intelligence techniques to at least a portion of the input data, wherein applying the one or more artificial intelligence techniques to at least a portion of the input data comprises processing at least a portion of the information pertaining to requirements for the at least one data replication operation using a time series stationary stochastic model comprising at least one autoregression and moving average technique and at least one activation function; and
to perform one or more automated actions based at least in part on the determined set of configuration parameters for the at least one data replication operation, wherein performing the one or more automated actions comprises:
performing a comparison of the determined set of configuration parameters for the at least one data replication operation to user-provided configuration parameters for the at least one data replication operation;
displaying, via at least one graphical user interface and based at least in part on the comparison, one or more configuration parameter changes, to the user-provided configuration parameters, recommended for the at least one data replication operation; and
updating, in at least one user data replication environment and by initiating one or more application programming interface calls, the at least one data replication operation in accordance with one or more of (i) at least one configuration parameter of the determined set of configuration parameters and (ii) at least one of the one or more configuration parameter changes.

18. The apparatus of claim 17, wherein applying the one or more artificial intelligence techniques comprises:
predicting, for each of multiple candidate configuration parameters, a probability of success if deployed in the at least one data replication operation by processing the configuration parameter and the at least a portion of the input data using the at least one autoregression and moving average technique; and
performing, for each of the multiple candidate configuration parameters, a binary classification by processing the predictions generated by the at least one autoregression and moving average technique using the at least one activation function.

19. The apparatus of claim 17, wherein performing the one or more automated actions comprises arranging the at least one data replication operation in accordance with the determined set of configuration parameters.

20. The apparatus of claim 17, wherein the at least one processing device is further configured:
to build the time series stationary stochastic model by processing historical data pertaining to multiple data replication operations.

* * * * *